though filed in the United States Patent

Edixhoven

[11] 3,766,815
[45] Oct. 23, 1973

[54] APPARATUS FOR FORMING STRIP
[75] Inventor: Gerardus Hendrikus Edixhoven, Voorschoten, Netherlands
[73] Assignee: Hunter Douglas International N.V., Curacao, Netherlands Antilles
[22] Filed: Dec. 29, 1971
[21] Appl. No.: 213,548

[30] Foreign Application Priority Data
Jan. 8, 1971 Germany............... P 21 00 646.2

[52] U.S. Cl..................... 83/160, 29/24.5, 83/210, 83/255, 83/268, 83/405
[51] Int. Cl............................................. B26d 7/16
[58] Field of Search....................... 83/79, 157, 158, 83/160, 209, 210, 211, 212, 213, 255, 268, 358, 364, 365, 367, 370, 405; 29/24.5

[56] References Cited
UNITED STATES PATENTS
| 3,555,864 | 1/1971 | Wegner............................ | 29/24.5 X |
| 3,244,047 | 4/1966 | Daniluk........................... | 83/367 X |
| 1,852,831 | 4/1932 | Young.............................. | 83/158 X |
| 2,999,409 | 9/1961 | Gollwitzer....................... | 83/158 X |
| 3,522,750 | 8/1970 | Shallenberg.................... | 83/365 X |
| 2,503,994 | 4/1950 | Bottos............................. | 83/210 X |

Primary Examiner—Andrew R. Juhasz
Assistant Examiner—James F. Coan
Attorney—Dean S. Edmonds et al.

[57] ABSTRACT
An apparatus according to the invention comprises means for feeding strip material, means for forwarding the strip material through a forming station including a forming device such as a punching and/or cutting and/or machining device, an output table having one or more stop devices adjustable longitudinally with respect to the direction of forwarding of the strip material, the stop device or devices including a stop member driven by an electric motor so as to be movable transversely of the path of the strip material downstream of the forming station, means associated with the stop member for initiating actuation of the forming device and an electrical control system. The or each stop member is moved by a linear electric motor and comprises a horizontal rail movable into the path of the strip material, having a supporting tongue extending horizontally beyond the lower end of a vertical edge of the rail, the vertical edge forming an ejection surface above the top surface of the tongue which supports strip material thereon when the rail is retracted. The or each stop member is movable with respect to an associated housing, which is connected to an adjustable support block which is securable to the output table at any desired position thereof, the housing and block having a resilient buffer therebetween. An advantage of this construction is that the impacts sustained by the stop members, occasioned by the increased working speed, can be balanced by the buffers, so that the strip material or the cut strip does not undergo deformation in the longitudinal direction, which would have the consequence that the punching and the severing cuts would not take place at the intended positions.

9 Claims, 6 Drawing Figures

APPARATUS FOR FORMING STRIP

The present invention relates to an apparatus for forming strip material. The forming with which the invention is connected is punching and/or cutting and/or machining strips of material, especially for the manufacture of strips for blinds made from ribbon material. One known apparatus of this type includes a feed device for the strip material, a forming station including a punching and/or cutting and/or machining device, strip forwarding means, an output table with longitudinally adjustable stop devices for the ribbon material, a discharge device and a control arrangement which controls the operation of the forming station, the stops and the discharge device as a function of the position of the strip material and/or of a cut strip.

A disadvantage of this known device is that it has a low working speed.

According to the present invention there is provided apparatus for forming strip material, such apparatus comprising means for feeding strip material, means for forwarding the strip material through a forming station including a forming device such as a punching and/or cutting and/or machining device, an output table having one or more stop devices adjustable longitudinally with respect to the direction of forwarding of the strip material, the stop device or devices including a stop member driven by an electric motor so as to be movable transversely of the path of the strip material downstream of the forming station and means associated with the stop member for initiating actuation of the forming device. In a preferred construction the or each stop member is moved by a linear electric motor.

With such apparatus, for example, the strips of blinds can be produced at practically double the previous speed of manufacture.

An advantage of the device is that it permits the use of linear motors in conjunction with other circuit components which can operate practically without delay, so that it has been possible substantially to increase the working speed. Linear motors can also be used for forwarding the strip material and/or the cut strips in the longitudinal direction of the apparatus.

In a preferred construction according to the invention, the or each stop member comprises a horizontal rail movable into the path of the strip material, having a supporting tongue extending horizontally beyond the lower end of a vertical edge of the rail, the vertical edge forming an ejection surface above the top surface of the tongue which supports strip material thereon when the rail is retracted.

An advantage of this arrangement is that the speed of manufacture of the strips can be increased since a retraction of the stop member, merely to deposit the finished strip can be omitted. The depositing of the finished strip takes place as a forced action when the individual stop rails are retracted in order to free the path of movement for the subsequent passage of strip material.

Advantageously, the or each stop member is movable with respect to an associated housing, which is connected to an adjustable support block which is securable to the output table at any desired position thereof, the housing and block having a resilient buffer therebetween. The resilient buffers are preferably coil springs.

An advantage of this is that the impacts sustained by the stop members, occasioned by the increased working speed, can be balanced by the buffers, so that the strip material or the cut strip does not undergo deformation in the longitudinal direction, which would have the consequence that the punching and the severing cuts would not take place at the intended positions.

An abutment may be provided associated with the or each stop member, to one side of the path of movement of the strip material to prevent lateral movement of the strip material upon retraction of the stop member. The abutment member may be in the form of a spring wire arch, secured at one end so that it spans the path of movement of the strip material and so that its free end can be lifted by an ejected strip.

With this arrangement there is no danger that the returning stop member track would draw the strip located on the supporting tongue back into the path of movement of the strip material which would inevitably lead to disruption of the production sequence.

Preferably sensing means are located in front of the or each stop member, the sensing device sensing the arrival of the leading edge of a strip thereby controlling the operation of the forwarding means and the forming device in the forming station.

A partially electrically or electronically operated control and operating device, can be so constructed that a varying number of combined stop and members can be connected to it, so that there is the possibility of providing the strips to be produced with any desired number of punchings, depending on the size and end use of the strips.

In order that the invention may more readily be understood, the following description is given, merely by way of example, reference being made to the accompanying drawings, in which.

Figure 1:
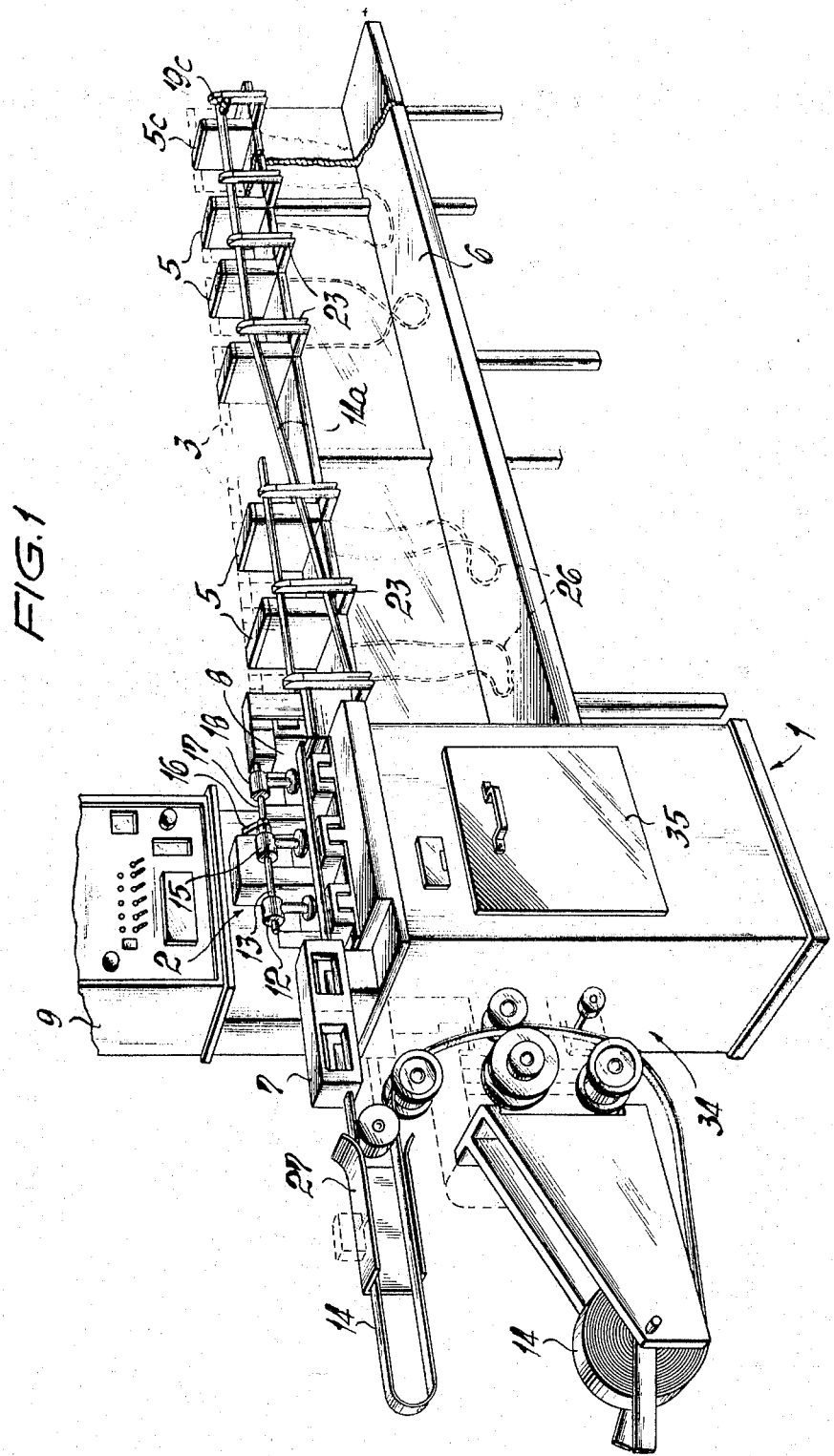
FIG. 1 is a perspective view of one embodiment of apparatus according to the invention.
Figure 2:
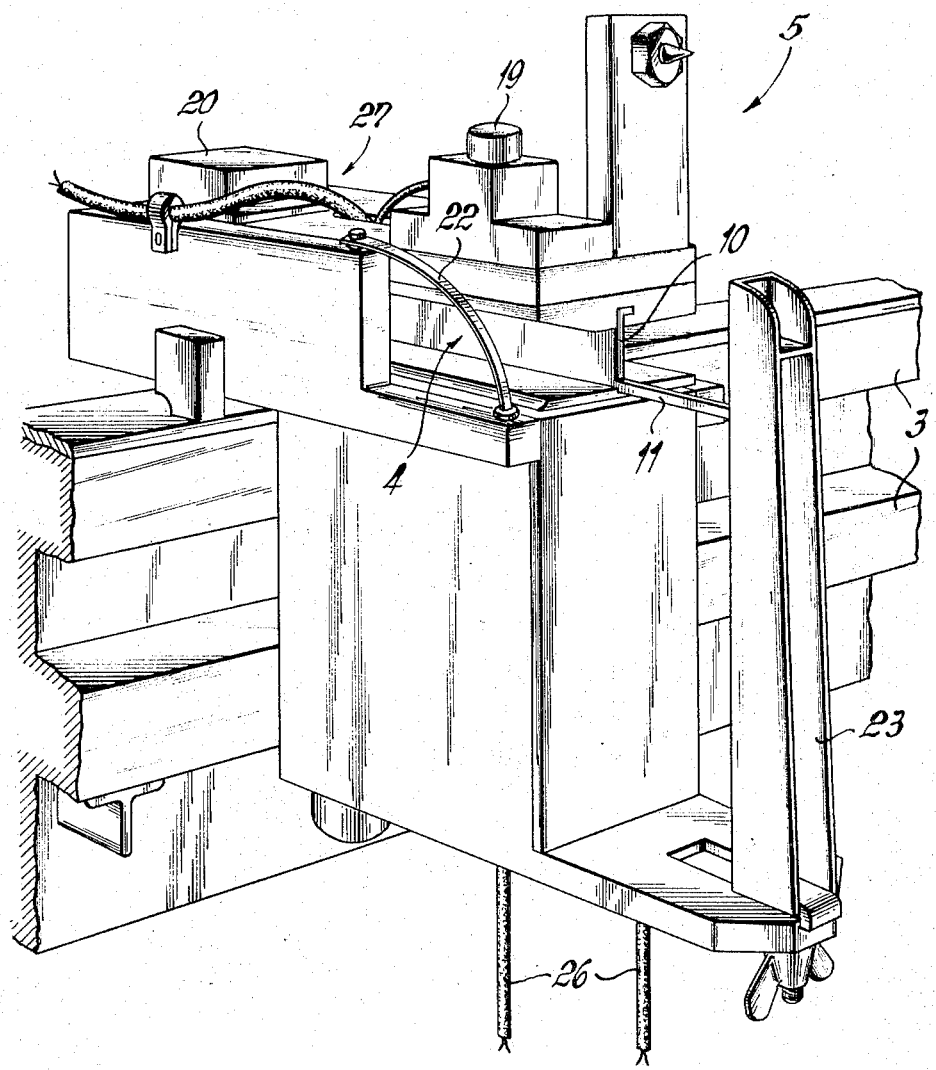
FIG. 2 shows a perspective view, to an enlarged scale, of a stop member and associated parts of the apparatus of FIG. 1 viewed in the forwarding direction, the stop member being shown in the advanced position.

The arrangement of the individual parts of the apparatus 1 can be seen from FIG. 1. A feed device 34, which unrolls and forwards a ribbon of strip material 14 is located on one side of a plinth which holds a forming station 2 including a punching and cutting device and at the same time serves as a scrap box 35 for the punched waste. In this instance, the feed device simultaneously acts as a shaping device, which imparts to the flat strip material the curvature which is customary in strips for Venetial blinds. However, already pre-curved strip material can also be used. On the opposite side there is an output table 6 on which are provided stop devices 5. A control cabinet 9 of the control and operating device is located above the forming station 2 and is connected to the plinth. To avoid the interruptions in the feed motion, during the operation of the punching and cutting devices of the forming station 2, resulting in the strip material 14 supplied by the feed device 34 being fed to an inadequate extent, the strip material is passed in a loop through an accumulator channel 27.

Two linear electric motors 7 and 8 are provided for forwarding the strip material 14 upstream and downstream of the forming station 2 respectively. This station includes a left-hand punch device 12, a right-hand punch device 18, a cutting device 15, a left-hand cam shaft 13, a right-hand cam shaft 17 and a cam shaft drive mechanism 16. The stop devices 5 are located so that they can be detached from, adjusted on and fixed to a guide track 3 which is firmly mounted in the upper part of the output table 6. Cables 26 lead from the stop devices 5 to the control cabinet 9. The number of stop devices 5 can be chosen to suit the design of the strips to be manufactured, the number depending on the number of punchings to be effected in the strip.

The devices 5 are fixed to the guide track 3 at the desired distance from the punching and cutting device. Each device 5 has a linear motor 20 in a housing 27, which actuates a stop and discharge rail 4 to move in a guide track at right angles to the direction of forwarding of the strip. The forward face 10 of the rail forms a stop surface and a supporting tongue extends beyond the lower end of a vertical edge 10a (FIG. 5) of the rail 4. A strip accumulator 23, adjustable mounted on the device 5, and defines a gap with the vertical end wall of the guide for the rail 4. A sensing device, constructed as a photocell 19, is mounted in front of the rail 4, above the path of movement of the strip. A spring arch 22, which bridges the axial path of movement of the strip material prevents the previously produced strip (not shown in the drawing), which rests on the supporting tongue 11, from being drawn back into the forwarding path of movement of the strip material, when the rail 4 is retracted towards the linear motor 20. The arch 22, which is only fixed at one end, does not prevent the finished strip from being pushed out of this path of movement.

Figure 3:
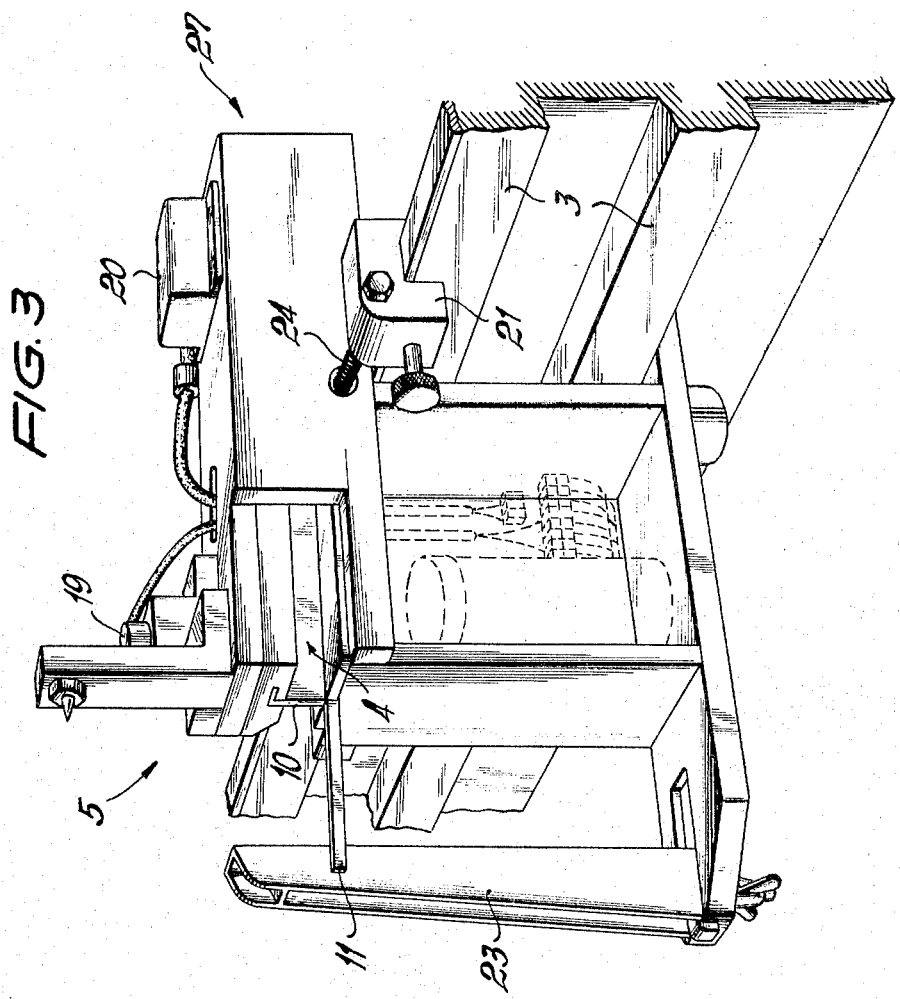
FIG. 3 shows a perspective view of the parts of the apparatus shown in FIG. 2, from the other side.

FIG. 3 shows the stop device 5 from the other side, and makes clear the sprung of spring mounting arrangement of the device on the guide track 3. A fixing block 21 is adjustably secured to the track and between this and the housing of the device 5 a coil buffer spring 24 is located so that the impacts of the material which strikes the stop surface 10, can be absorbed, and the strip material or the cut strips are not bent and the severing cut or the punching at the other end of the strip material or of the cut strip takes place at the correct position.

Figure 4:
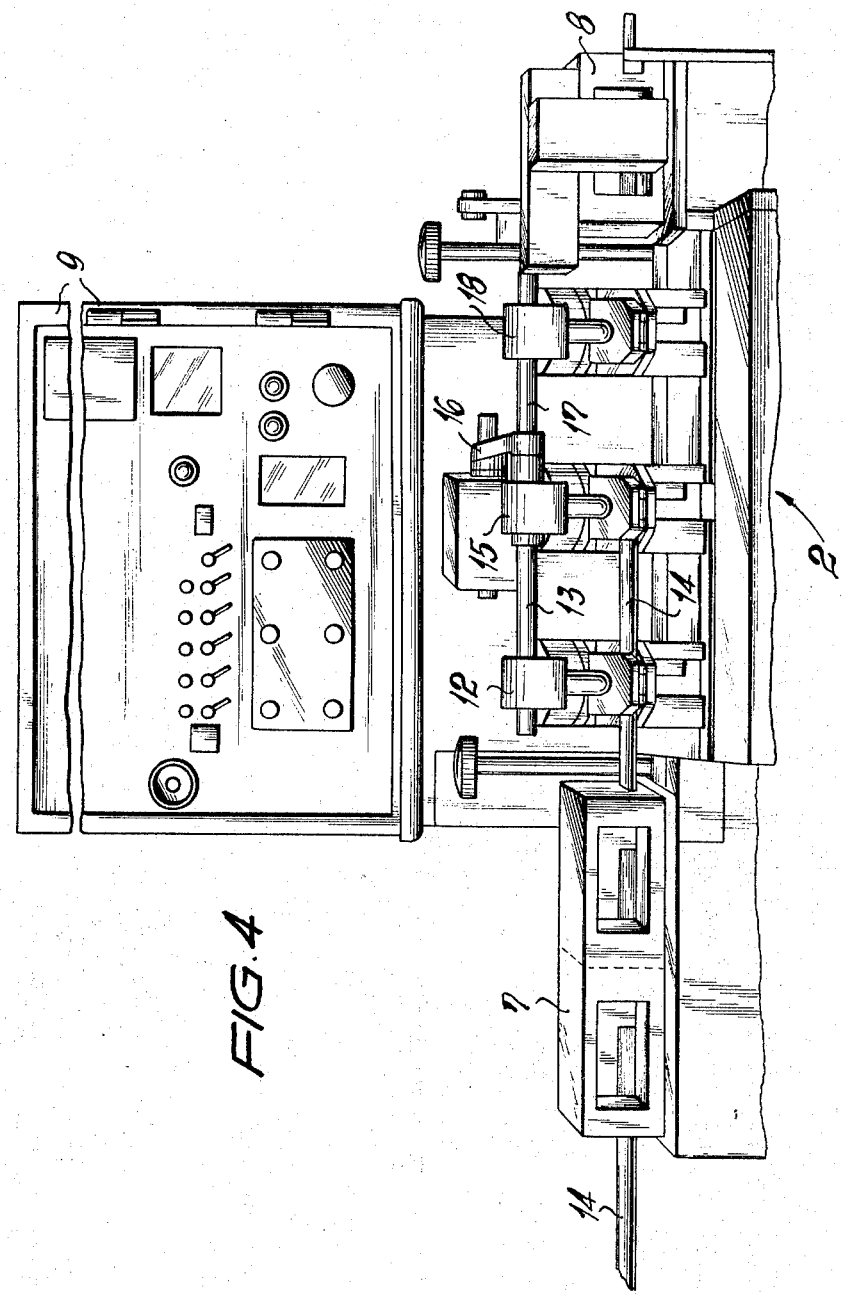
FIG. 4 is a front elevation of the punching and cutting device.

FIG. 4 shows the forming station 2, with the linear motors 7 and 8, required for the forwarding of the strip material 14 or of the cut strip located upstream and downstream of the forming station. The punching device 18 and the punching device 12 together with the cutting device 15 can be actuated separately, since the drive of the cam shaft 17 can be separated from, or connected to, the cam shaft drive mechanism 16 by means of a clutch. In order to control the forwarding of the strip material or of the cut strips, the linear motor can be so constructed that its energy for advancing the ribbon material can be regulated; alternatively, several motors can be used instead of one motor. The door of the control cabinet 9 accommodates the switches for automatic or programmed operation of the apparatus and switches for operating the punching and cutting devices independently of the photocells 19 of the stop devices 5.

Figure 5:
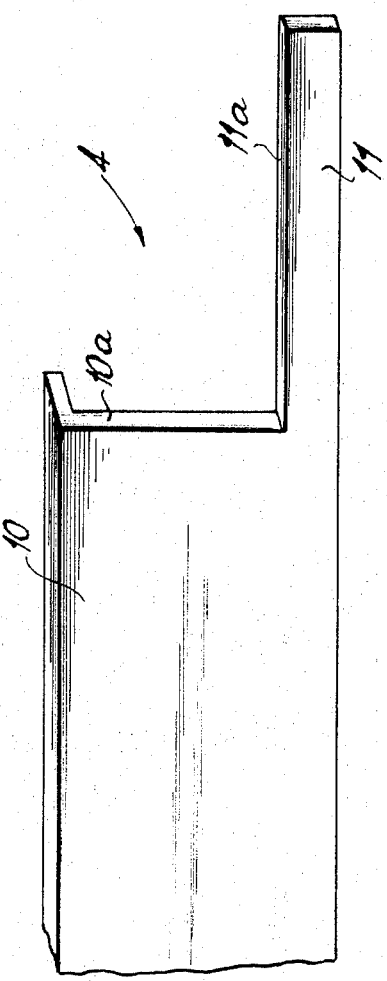
FIG. 5 shows a view of the stop rail.

FIG. 5 shows, on an enlarged scale, the stop and discharge trail 4. The supporting tongue 11, the height of which does not project above the path of movement of the strip material or of the cut strips, is located in the lower region of the stop surface 10. The vertical edge 10a forms an ejection surface and the upper edge 11a of the tongue acts to support the strip which is to be pushed out of the normal forwarding path of movement of the strip material.

Figure 6:
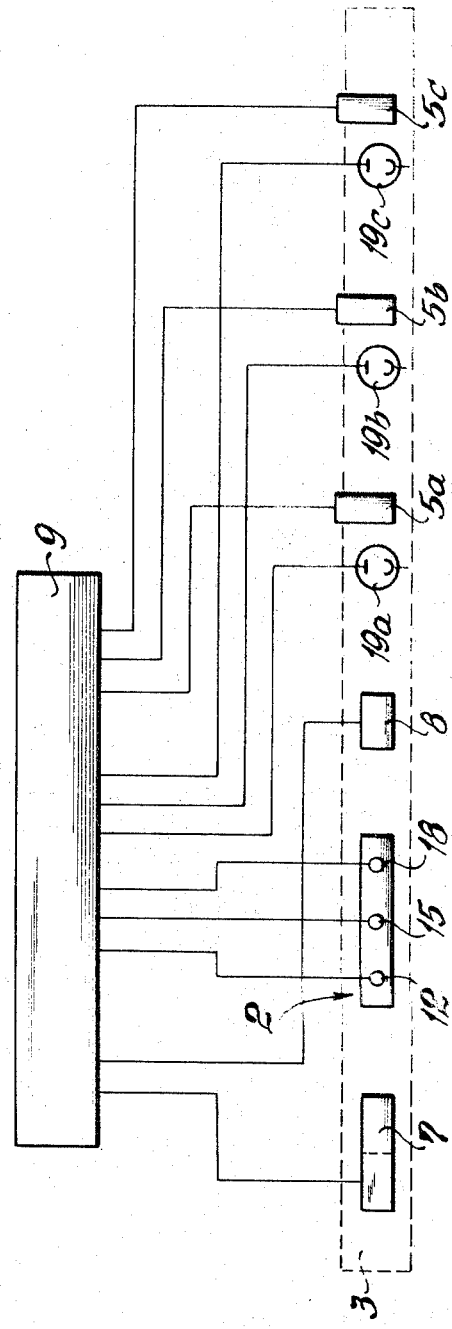
FIG. 6 shows a schematic circuit diagram of the apparatus.

FIG. 6 illustrates schematically, for the manufacture of strips with three punched orifices, the electrical circuit of the linear motors 7 and 8 of the photocells 19a, 19b and 19c, of the stop devices 5a and 5b of the end stop 5c and of the forming station 2. The intended switch sequence is effected through known devices in the control cabinet 9.

In operation: the strip material 14 is introduced manually into the punching and cutting device. The first punching and the first severing cut are also effected manually, after which the automatic controls of the apparatus are switched on. As a result of this, the linear motors 7 and 8 are switched on and the rails 4 of the stop devices 5a and 5b are switched so that the surfaces 10 are in the blocking position. When the strip material 14 passes the photocell 19a, the linear motor 7 is consequently switched off, so that the strip material 14, driven only by the linear motor 8, comes into delayed contact with the stop 10 of the first stop device 5a. After reaching the stop surface 10, the punching device 18 is actuated in response to the signal of the photocell 19a (after a short time delay) and the requisite orifice is punched in the strip material. After the punching device 18 has been actuated, the stop rail 4 of the stop device 5a retracts so that supporting tongue 11 passes under the path of movement of the strip material 14. At the same time, the linear motor 7 is again switched on and this together with the linear motor 8 forwards the strip material at higher speed in the direction of the stop surface 10 of the stop device 5b. On passing the corresponding photocell 19b, the linear motor 7 is switched off again, so that the strip material again makes delayed contact with the stop surface 10 and the forming station devices are actuated by the signal of the photocell 19b (after a short time delay). The drives of the punching devices 12 and 18 and of the cutting devices 15 are thus initially coupled so that two punching and one severing operation take place. As a result of the severing operation, the finished strip is severed from the strip material. After the forming station devices have been actuated, the corresponding stop rail 4 retracts, so that with the linear motor 7 still switched off, the linear motor 8 forwards the finished strip in the direction of the end stop 5c. This end stop is constantly in the stop position and only the corresponding photocell 19c is included in the control and operating system. When the photocell 19c is passed, a signal is generated, the consequence of which is that immediately the finished strip strikes the end stop 5c the stop rails 4 of of the stop devices 5a and 5b are switched into the blocking position and the linear motor 7 is switched on again in order to forward the strip material in the direction of the stop device 5a. When the stop rails 4 move forward, the finished strip is displaced laterally by the ejection surfaces 10a, in doing so passes the arches 22 and rests on the supporting surfaces 11a of the supporting tongues 11. The further forwarding of the following strip material is not hampered by the finished strip. In the next cycle of the process, the finished strip is lowered stepwise into the accumulator 23. When the first stop rail is retracted, the associated supporting tongue retracts with it, and as a result the part of the finished strip 14a which rests thereon falls downwards, this being repeated for each stop rail until the last stop rail is retracted. The last part of the strip 14a then falls down, so that the finished strip lies in the accumulator. The advance of the subsequent strip material and the simultaneous descent of the laterally displaced strip 14a can be seen particularly from FIG. 1.

I claim:

1. Apparatus for forming strip material comprising a forming station, an output table, means for feeding strip material and for forwarding the strip material through the forming station and along the output table, strip-forming means in the forming station of the type including a cut-off means, stop means mounted on the output table downstream of the forming station and adjustable longitudinally with respect to the direction of the forwarding of the strip material therealong, the stop means including a horizontal rail, motor means for driving the rail of the stop means and for moving it transversely of the path of movement of the strip material, and means associated with the stop means for initiating actuation of the forming means.

2. Apparatus according to claim 1, wherein the motor for driving the rail of the stop means is a linear electric motor.

3. Apparatus according to claim 1, wherein the strip-forwarding means comprises at least one linear electric motor.

4. Apparatus according to claim 1, wherein the horizontal rail has a vertical end edge for ejecting finished strips, a strip-supporting tongue extending horizontally from and beyond the lower portion of said vertical edge of the rail, the vertical edge forming an ejection surface for strip material above the top surface of said tongue, said tongue supporting strip material thereon when the rail is retracted.

5. Apparatus according to claim 1, including a housing associated with the stop means and wherein the stop rail is movable with respect to the associated housing, an adjustable support block connected to the housing, means for securing the block to the output table at a selected position thereof, and a resilient buffer between the housing and block.

6. Apparatus according to claim 1, including means associated with the stop rail and located to one side of the path of movement of the strip material for preventing lateral movement of the strip material upon retraction of the stop rail.

7. Apparatus according to claim 6, wherein said means associated with the stop rail is in the form of a spring secured at one end so that it spans the path of movement of the strip material and has a free end which can be lifted by a strip being ejected.

8. Apparatus according to claim 1, including sensing means located in front of the stop rail and arranged to sense the arrival of the leading edge of a strip as it approaches the rail, and means responsive to the actuation of the sensing means for stopping the operation of the forwarding means in the forming station.

9. Apparatus according to claim 8, wherein the sensing means located in front of the stop rail for sensing the arrival of the leading edge of the strip includes a photocell, and means responsive to the actuation of the photocell for controlling the operation of the strip-forwarding and -forming means at the forming station.

* * * * *

PO-1050
(5/69)

UNITED STATES PATENT OFFICE
CERTIFICATE OF CORRECTION

Patent No. 3,766,815          Dated October 23, 1973

Inventor(s) Gerardus Hendrikus Edixhoven

It is certified that error appears in the above-identified patent and that said Letters Patent are hereby corrected as shown below:

In the disclosure, column 3, line 38 reads "sprung of spring"
should read -- sprung or spring --

In the disclosure, colums 3, line 67 reads "trail 4."
should read -- rail 4. --

Signed and sealed this 4th day of June 1974.

(SEAL)
Attest:

EDWARD M. FLETCHER, JR.
Attesting Officer

C. MARSHALL DANN
Commissioner of Patents